April 24, 1951 W. B. COSTIN 2,550,228
FISHING TOOL
Filed Sept. 28, 1948
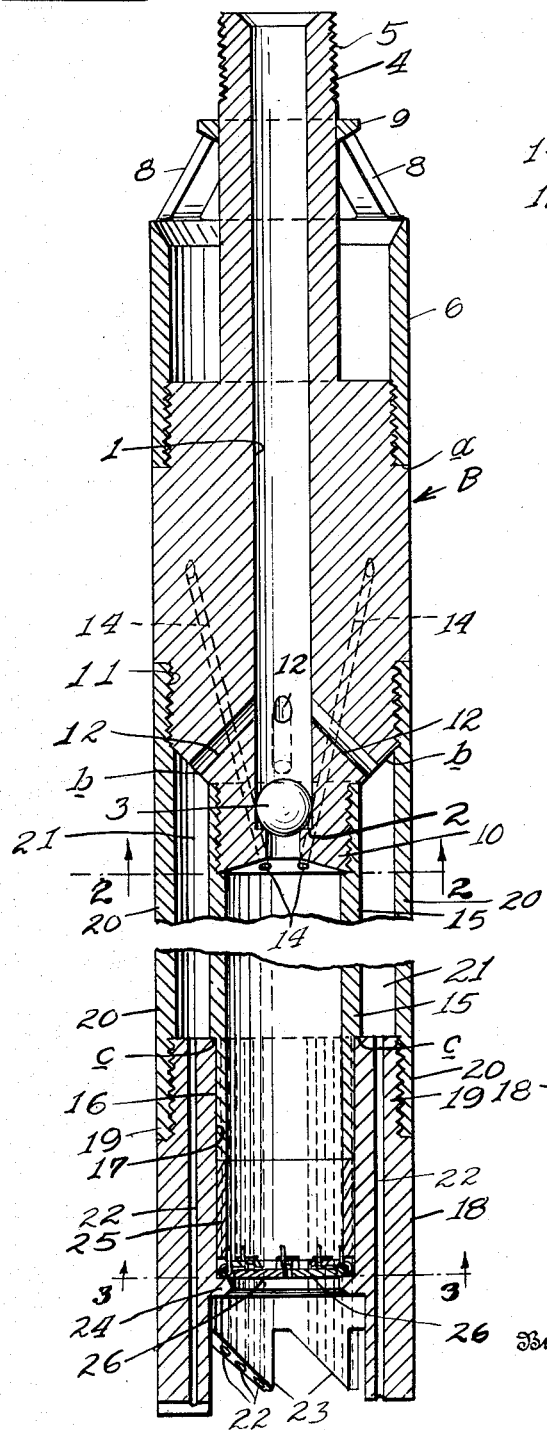
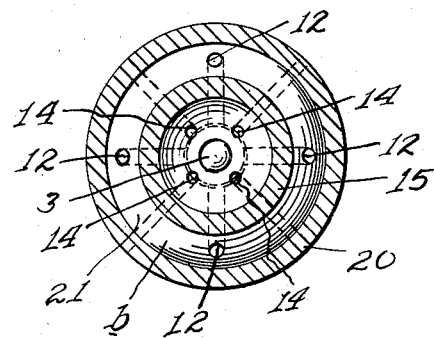
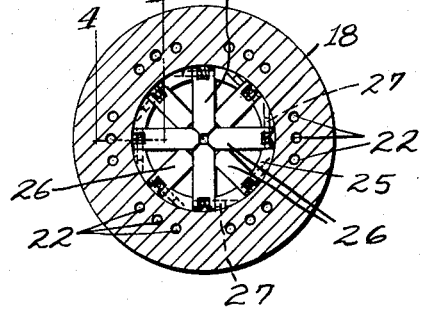
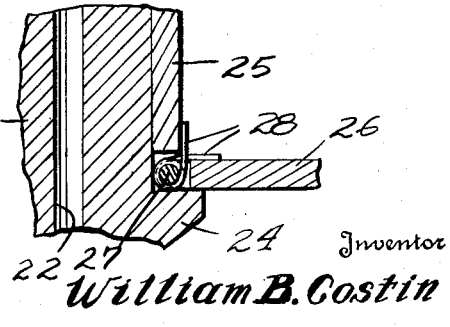
Inventor
William B. Costin
By Wilfred E. Lawson
ATTORNEY Patented Apr. 24, 1951

2,550,228

UNITED STATES PATENT OFFICE 2,550,228

FISHING TOOL

William B. Costin, Seminole, Tex.

Application September 28, 1948, Serial No. 51,590

6 Claims. (Cl. 294—86.1)

This invention relates to a fishing tool for deep wells and it is an object of the invention to provide a tool of this kind for use in removing cones, bearings and junk.

It is also an object of the invention to provide a tool having a top basket which is constructed in a manner to allow a fluid circulation which when flowing in one direction will carry bearings and small pieces to the top basket and when flowing in the opposite direction will push cones or other heavy pieces into a bottom cone catcher.

Furthermore, it is an object of the invention to provide a tool of this kind which can be readily assembled or broken down.

The invention consists in the details of construction and in the combination of the several parts of my improved fishing tool whereby certain advantages are attained, as will be hereinafter more fully set forth.

In order that my invention may be better understood, I will now proceed to describe the same with reference to the accompanying drawings, wherein:

Figure 1 is a vertical sectional view taken lengthwise and substantially through a fishing tool constructed in accordance with an embodiment of the invention;

Figure 2 is a sectional view taken substantially on the line 2—2 of Figure 1;

Figure 3 is a sectional view taken substantially on the line 3—3 of Figure 1; and Figure 4 is an enlarged fragmentary view taken substantially on the line 4—4 of Figure 3.

In the embodiment of the invention as illustrated in the accompanying drawings, B denotes a body member preferably cylindrical in form and of desired dimensions. Disposed axially through the body B is a bore 1. The lower extremity of the bore 1, is reduced in diameter to provide an inwardly facing internal and annular valve seat 2, with which coacts a valve member 3, herein disclosed as spherical and which can be readily dropped into the body member B through the upper open end thereof.

The bore 1 is continued through an extended stem 4 at the top end of the body B at the axial center thereof and which stem is of radius throughout its length considerably less than the radius of the top end of the body members B. The outer end portion of the stem 4 is herein shown as exteriorly threaded as at 5, for coupling with a conventional line.

The upper portion of the body member B is provided therearound with a peripheral rabbet $a$ which snugly receives the lower portion of a basket sleeve 6 of desired length. The margin of this sleeve 6 is provided at space points therearound with the outwardly disposed and inwardly inclined arms 8. Rigid with the outer portions of the arms 8, is an annular member 9 which snugly but freely engages around the stem 4. As shown in the accompanying drawings the member 9 is positioned on the stem 4 below the threaded portion 5, when the basket sleeve 6 is seated on the rabbet $a$.

The bottom end of the member B centrally thereof is provided with a short cylindrical extension 10 of a radius materially less than the radius of the body B and through which the bore 1 is also directed. The bottom end portion of the body B is tapered as at $b$ toward and to the extension 10 on an angle of approximately forty-five (45) degrees, and the portion of the body B immediately adjacent to the tapered portion $b$ is provided with an exteriorly threaded reduced portion 11.

Disposed through the bottom portion of the member B at points equidistantly spaced therearound are the ports 12. These ports open out through the tapered portion $b$ and extend inwardly therefrom at substantially right angles thereto and lead to and have communication with the bore 1.

Also disposed through the lower portion of the member B and the bottom extension 10 thereof and between the ports 12, are the ports 14. These ports as herein disclosed are straight from end to end as are also the ports 12. The ports 14 are disposed toward the top portion of the member B on desired angles and open out through the outer end of the extension 10 and at the periphery of the body B at points substantially midway the ends thereof.

Threading upon the bottom extension 10 of the body B is the top portion of an elongated catcher sleeve 15 adapted to receive cones or other heavy pieces to be fished out. The bottom portion of the sleeve 15 is reduced as at 16 from without in thickness to provide on the sleeve 15 a downwardly facing surrounding shoulder $c$.

The portion 16 of the sleeve 15, is snugly received in the upper portion of the bore 17 of the bottom sleeve 18 with the shoulder $c$ resting upon the inner marginal portion of the sleeve 15. The wall of the sleeve 18 is relatively thick and the upper portion thereof is exteriorly reduced as at 19 and threading upon said portion 19 is the lower extremity of the elongated sleeve 20, the opposite end portion of which engages the portion 11 of the body B.

The sleeve 20 coacts with the sleeve 15 to provide a chamber 21 surrounding the sleeve 15 between the tapered portion b of the body B and the inner end of the sleeve 18. It is also to be pointed out that the thickness of the inner end of the wall of the sleeve 18 is such to close the bottom end of the chamber 21.

Disposed through the wall of the sleeve 18 at desired points therearound are the passageways or courses 22 herein disclosed in groups of three with such groups equidistantly spaced circumferentially around the sleeve 18.

The inner ends of the passageways or courses 22 open into the chamber 21 while the opposite ends thereof open out through the outer end face of the wall of the sleeve 18.

The outer portion of the sleeve 18 is formed to provide the relatively large teeth 23 to facilitate the action of the tool in a manner and for a purpose which is believed to be clearly apparent to those skilled in deep well operations.

The sleeve 18 inwardly of the teeth 23 but preferably closely adjacent thereto is provided therearound with the inwardly disposed flange 24 against which engages the inner or lower end a sleeve 25 which is snugly held in place by the end portion of the sleeve 15 received in the sleeve 18.

Carried by the lower extremity of the sleeve 25 are the inwardly directed and substantially radially disposed elongated catches 26. Each of these catches 26 has its outer end portion pivotally connected as at 27 with the wall of the sleeve 25 and in a manner whereby the catches may readily swing inwardly of the sleeve but prevented from swinging outwardly of the sleeve. The catches 26 are normally maintained in a position substantially at right angle to the axis of the sleeve 25 by the spring element 28.

When starting the tool in a hole with the basket as afforded by the sleeve 6, the valve member 3 is not applied until after the tool has reached the bottom of the hole and the required circulation is attained. The tool is then slowly rotated and the pump pressure increased up to about 800 pounds to get bearing and the like into the basket. The circulation will be down through the bore 1, the chamber 21 and passageways 22 under the sleeve 18 and up between the periphery of the tool as a unit and the wall of the hole or casing therein. This will result in bearings or other small pieces being delivered into the basket afforded by the sleeve 6.

To remove a cone after breaking off the kelly the valve member 3 is dropped into the drill pipe and after sufficient time has elapsed to allow the valve member 3 to reach its seat member 2, the fishing operation is started. After the valve member 3 reaches its seat member 2 the pump pressure is increased to 1400 pounds maximum. It has been fully demonstrated in practice that 600 pounds pressure will pick up one cone; 1000 pounds pressure will pick up two cones; and from 1200 pounds to 1400 pounds will pick up three cones.

During the fishing operation for cones the tool should be slowly rotated with the teeth 23 of the tool with about three points of weight, or just enough to keep the cone or cones rolling. After a reasonably short period of time the tool is raised and lowered so that the cone or cones may pass up into the cone basket above the catches 26. The catches 26 will readily swing inwardly or upwardly but will prevent dropping out of the cone or cones during the fishing operation.

It is also believed apparent that in the fishing operation for cones or the like the circulation will be down through the ports 12, chamber 21, passageway 22, and the liquid entering the cone basket will pass up through the sleeve 15 and discharge out through the ports 14 between the periphery of the tool and the wall of the hole or the casing therein.

No disclosure is herein made for creating the desired fluid circulation which is to be accomplished in accordance with method now in well known use.

From the foregoing description it is thought to be obvious that a fishing tool constructed in accordance with my invention is particularly adapted for use by reason of the convenience and facility with which it may be used and operated.

I claim:

1. A fishing tool for deep wells comprising a tubular body to be coupled to a drill line, the bore of said body being provided with an internal valve seat facing the upper end of the body, a collecting basket at the outer end portion of the body extending therearound, a valve member for coaction with the internal valve seat and freely inserted into the bore of the body through the upper end thereof, said body having ports therethrough opening through the inner end of the body and through the periphery of the body, an elongated sleeve having one end portion attached to the lower portion of the body, a bottom sleeve to which the lower portion of the first sleeve is connected, a third sleeve bridging the space between the lower portion of the body and the bottom sleeve, said third sleeve being spaced from the second sleeve to provide a chamber surrounding the second sleeve, the wall of the bottom sleeve being of a thickness to close the lower end of the chamber, said wall having ports therethrough open to the chamber and open at the outer end of the bottom sleeve, the bottom sleeve constituting a basket, and means within the sleeve permitting upward passage into said sleeve of pieces being fished for but preventing downward discharge therefrom.

2. A fishing tool as set forth in claim 1 wherein the first and second sleeves are detachably engaged with the body member and the third sleeve.

3. A fishing tool as set forth in claim 1 wherein the first basket comprises a sleeve detachably engaged with the upper portion of the body and extending therebeyond said upper portion of the body being provided with a stem extending therefrom and through which is continued the bore of the body, said extension terminating outwardly beyond the sleeve.

4. A fishing tool as set forth in claim 1 wherein the first basket comprises a sleeve detachably engaged with the upper portion of the body and extending therebeyond said upper portion of the body being provided with a stem extending therefrom and through which is continued the bore of the body, said extension terminating outwardly beyond the sleeve, a member freely and snugly surrounding the stem at a point outwardly from the sleeve, and arms connecting the member to the adjacent end portion of the last named sleeve.

5. A fishing tool for deep wells comprising a body having a bore therethrough, said bore having a valve seat thereon facing toward the upper end of the bore, a valve member for coaction with the internal valve seat and freely inserted into the bore of the body through the upper end thereof, said body having ports therethrough opening through the inner end of the body and through the periphery of the body, an elongated sleeve having one end portion attached to the lower portion of the body, a bottom sleeve to which the lower portion of the first sleeve is connected, a third sleeve bridging the space between the lower portion of the body and the bottom sleeve, said third sleeve being spaced from the second sleeve to provide a chamber surrounding the second sleeve, the wall of the bottom sleeve being of a thickness to close the lower end of the chamber, said wall having ports therethrough open to the chamber and open at the outer end of the bottom sleeve, the bottom sleeve constituting a basket, and means within the sleeve permitting upward passage into said sleeve of pieces being fished for but preventing downward discharge therefrom.

6. A fishing tool as set forth in claim 5 wherein the means within the bottom sleeve comprises an additional sleeve snugly fitting in the lower portion of the bottom, an inwardly disposed flange carried by the bottom with which said sleeve engages the extremity of the second sleeve engaging the upper extremity of the additional sleeve to hold said additional sleeve against the flange, and elongated catches pivotally engaged with the bottom portion of the additional sleeve and normally disposed inwardly and substantially radial of the additional sleeve.

WILLIAM B. COSTIN.

REFERENCES CITED

The following references are of record in the file of this patent:

UNITED STATES PATENTS

| Number | Name | Date |
|---|---|---|
| 2,090,616 | Erwin | Aug. 24, 1937 |
| 2,096,056 | Miller | Oct. 19, 1937 |
| 2,159,249 | Brantly | May 23, 1939 |
| 2,416,613 | Costin | Feb. 25, 1947 |